United States Patent [19]

Tomich

[11] 4,104,931
[45] Aug. 8, 1978

[54] POSITIVE HOLD DIFFERENTIAL

[76] Inventor: Michael G. Tomich, 20519 Catalano Dr., Mt. Clemens, Mich. 48043

[21] Appl. No.: 668,473

[22] Filed: Mar. 19, 1976

[51] Int. Cl.² ............................................. F16H 35/04
[52] U.S. Cl. ....................................................... 74/650
[58] Field of Search ................................. 74/711, 650

[56] References Cited

U.S. PATENT DOCUMENTS

| 1,529,804 | 3/1925 | Nogrady | 74/711 |
| 1,586,861 | 6/1926 | Taylor | 74/711 |
| 2,231,968 | 2/1941 | Thornton | 74/650 |
| 2,329,075 | 9/1943 | Myers | 74/650 |
| 2,545,601 | 3/1951 | Brybaker | 74/711 |
| 2,638,794 | 5/1953 | Knoblock | 74/650 |
| 2,667,087 | 1/1954 | Myers | 74/650 |
| 2,667,088 | 1/1954 | Myers | 74/650 |
| 2,830,466 | 4/1958 | Myers | 74/650 |
| 2,850,922 | 9/1958 | Welsh | 74/711 |
| 3,258,993 | 7/1966 | Dupras | 74/711 |
| 3,335,623 | 8/1967 | Roach | 74/711 |
| 3,396,609 | 8/1968 | Stockton | 74/711 |
| 3,397,593 | 8/1968 | Knoblock | 74/650 |
| 3,791,238 | 2/1974 | Bokoyoy | 74/650 |

OTHER PUBLICATIONS

NoSpin & Tandem-Lock Differentials — Operation & Application, A. A. Choma, S.A.E. Publication, Ener. & Opers. Meeting, Fort Wayne, Ind., Oct. 9-12, 1972, pp. 1-12.
OPERATION NoSpin Differential Operative Manual, Detroit Automotive, pp. 1-12, 1973.

Primary Examiner—Samuel Scott
Assistant Examiner—Lance W. Chandler
Attorney, Agent, or Firm—Basile and Weintraub

[57] ABSTRACT

A positive locking differential that functions to compensate for the difference in driving wheel travel which occurs when turning or traveling over uneven ground, while at the same time functioning to prevent wheel-slip when one wheel looses traction. The differential comprises a spider-center cam assembly having four trunnions projecting radially from a center ring on each side of which is located a plurality of fixed driving clutch teeth. The internal diameter of the spider mounts the center cam in such a manner that the same may be rotated a limited, predetermined distance. The center cam is symmetric having cam lifts on each side which include rounded surfaces that provide anti-friction ramps for disengaging driven clutch members mounted on each side of the spider and center cam assembly. The driven clutch members have clutch teeth which correspond to the clutch teeth on the spider and through which a driving torque is transmitted. Disengaging cams radially inwardly spaced from the driven clutch teeth and rigidly attached to the clutch are adapted to mesh with the cams of the center cam member. Enlarged sections and corresponding slotted portions disposed between the clutch members and the spider-cam assembly at spaced intervals maintain the clutch members in a disengaged mode during relative movement between the clutch members and the spider-cam assembly. Suitable splined members are provided to receive the vehicle axle shafts to transmit the torque from the positive locking differential to the vehicle wheels.

8 Claims, 9 Drawing Figures

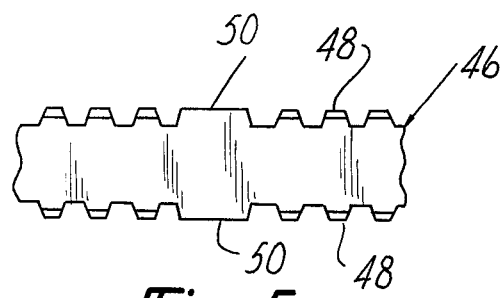
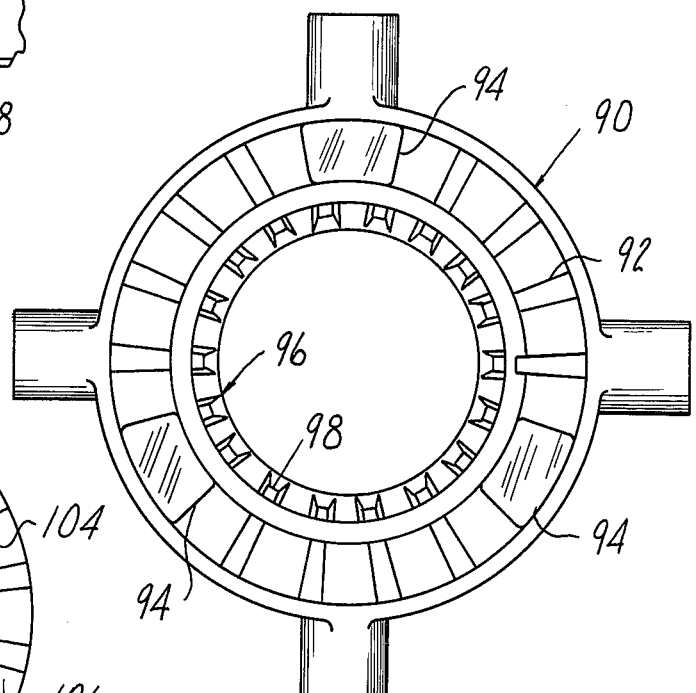
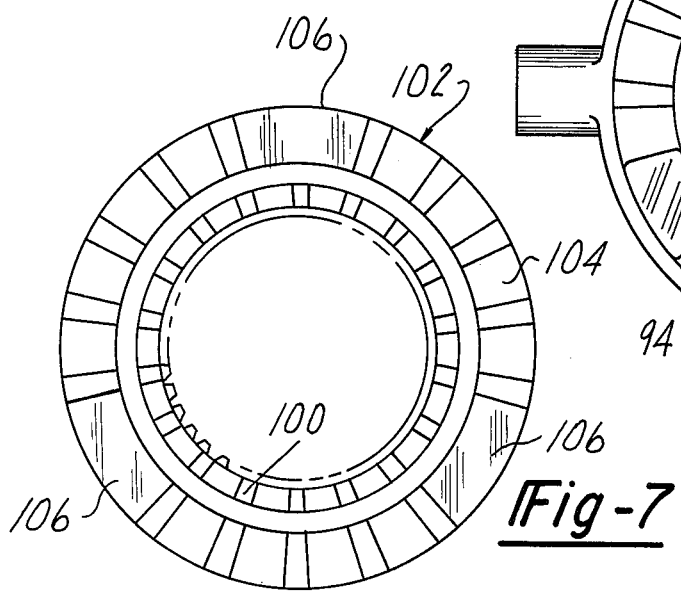
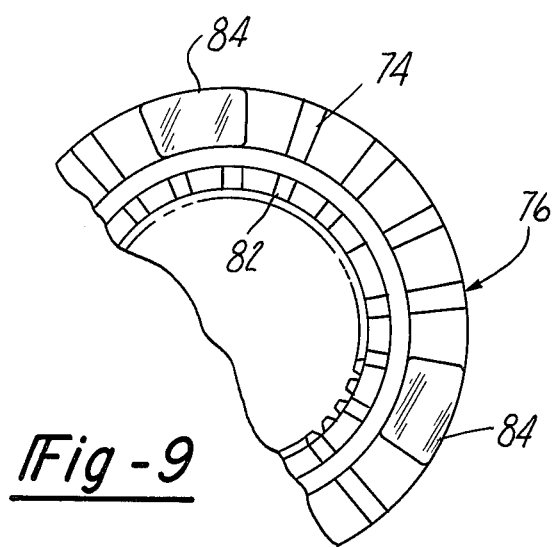
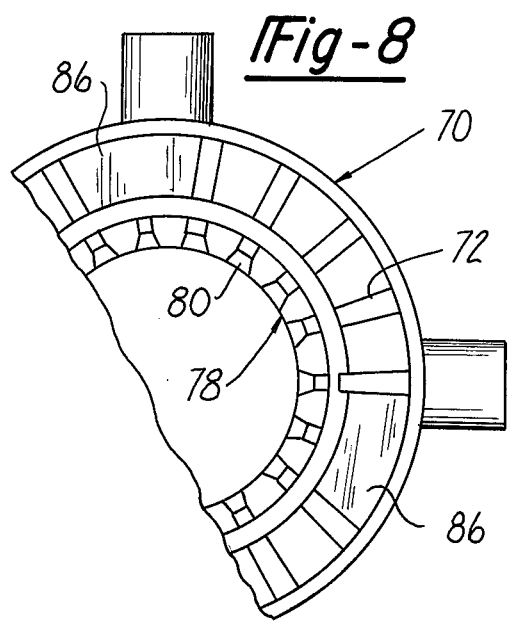

POSITIVE HOLD DIFFERENTIAL

BACKGROUND OF THE INVENTION

I. Field of the Invention

The present invention relates to positive locking differentials for providing a positive drive to both wheels of a vehicle while allowing differential action when required.

II. Description of the Prior Art

Many of the earliest mechanical-driven vehicles were of the tri-wheel type with power and steering being provided to the single wheel, while the two remaining wheels were free to independently rotate on their axles as required when making turns. These designs were soon discarded in favor of the four-wheel type of vehicle which not only increased stability and improved appearance, but provided for much better distribution of weight. The earlier four-wheel vehicles had power transmitted to one wheel by means of a chain and sprocket arrangement, while the other rear wheel remained free to rotate independently on turns. The first practical installation of a bevel gear type differential permitted the four-wheel vehicle to be driven by two powered rear wheels, yet one wheel could rotate faster or slower than the other as required when turning corners or traveling over uneven surfaces. However, under certain conditions when one driving wheel slipped or lost traction, the other received little or no driving torque, thereby allowing the vehicle to stall. The development of modern-day power transmission units for driving axles of motor vehicles follows the same general design of operating characteristics used by their predecessors for the past 100 years. The present-day bevel gear differential remains the same except in size, material, specification, and number of components. For many years attempts have been made to overcome the principal disadvantage of the conventional differential; that is, of one free-spinning wheel permitting the vehicle to stall. Positive locking differentials have been devised for overcoming this problem and generally comprise a spider having fixed driving clutch teeth which are engageable with fixed teeth on a disengageable clutch. The clutch member disengages from the spider to overrun the same and accommodate a road condition or negotiate a turn.

It can be seen that, in the positive locking differential when turning a corner, the outside wheel must rotate faster than the inside wheel, otherwise serious tire scuffing would occur. When driving around a turn, the positive locking clutch driving the outside wheel is automatically disengaged permitting the wheel to rotate freely until the turn is completed and the clutch is reengaged. When the turn is being made, there will be a series of clicking sounds resulting from the alternate disengagement and engagement of the differential clutch teeth on the outside clutch. These clicking sounds, which are quite audible on small trucks and pickups, represent the major disadvantage of the positive locking differential. This undesirable characteristic has been eliminated by means of the holdout rings which are displaced by a key in the spider to a position between the fixed cams of the clutch members and, thus, preventing the clutch teeth from reengaging until the overrunning cycle has been completed. Generally, this consists of providing an axial groove in the teeth of the driven clutch and into which the holdout ring is snapped. The axial groove includes a slight undercut protruding radially inwardly at the bottom of the groove. Generally, each holdout ring is slotted and includes a shoulder protruding radially inwardly which locks into the undercut groove of the clutch and includes a plurality of lugs protruding axially inwardly. When the clutch and holdout ring are assembled to the spider and center cam assemblies, the gaps between the ends of each holdout ring mesh with the long spider key, and the axial lugs mate with the center cam slots. When a clutch and holdout ring assembly is required to rotate faster to make a turn through the overriding action of one wheel, the clutch is free to ride up over the cams of the center cam, while the other clutch is held in a firm locked engagement with the center cam by the natural resistance of the slower wheel. After the wheel begins to rotate forward, the shoulder on one end of the slot and the right holdout ring engage the spider key, locking it to the spider cam and setting its lugs ahead of the slot in the center cam. This prevents the driven cam from returning to engagement as long as it rotates faster than the spider and center cam assembly is being driven. When the overriding movement ceases and the relative speed of the spider and overriding clutch become the same, there is a slight reversal of torque so that the right holdout ring rotates back from the spider key and its lug becomes realigned with the center cam slot, permitting the driven clutch and holdout ring to return to full engagement with the spider center cam. While this aforementioned positive locking differential has functioned well to eliminate the aforementioned disadvantages of noisy operation, the modification, machining, and additional components necessary to have the holdout ring in each clutch on opposite sides of the spider represent a substantial cost in both labor and material. It would thus be advantageous and would represent a considerable improvement over the prior art if a positive locking differential of the type described were provided wherein the clutch overrides the spider teeth and is maintained in the overriding mode through a substantial degree of rotation without the necessity of the holdout ring.

SUMMARY OF THE INVENTION

The present invention, which will be described subsequently in greater detail, comprises a positive locking differential having a spider with drive teeth mating with the driven teeth on a clutch member, wherein the drive line torque is proportional at each axle shaft when the axle shafts are turning at the same speed, while differentiating during a power condition wherein the slower running shaft maintains a drive torque to the ground, and the faster running shaft (being ground driven) will cam out of engagement with the spider teeth until the two axles are synchronized. The clutch and spider cams are maintained in a non-engaging relationship during this overrun condition by means of a novel placement of teeth and mating slotted portions between the clutch, center cam, and spider.

It is therefore a primary object of the present invention to provide a new and improved positive locking differential of the type described wherein the teeth of the spider clutch are disengaged from the driven clutch teeth without the necessity for a holdout ring.

It is a further object of the present invention to provide such a positive locking differential which can perform in a satisfactory manner for transmitting torque to the driven wheels of a vehicle, while permitting the wheels to move at different speeds relative to each other as necessary to accommodate turning and variations in the road, the same being accomplished by a reduction of the components in prior art devices without a corresponding reduction in performance and operation.

It is still a further object of the present invention to provide a positive locking differential of the type described herein which is less expensive to manufacture.

Further objects, advantages, and applications of the present invention will become apparent to those skilled in the art of positive locking differentials when the accompanying description of several examples of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and in which:

FIG. 5 is a fragmentary view of the positive locking differential as seen from Line 5—5 of FIG. 3;

FIG. 6 is a fragmentary sectional view similar to FIG. 3 illustrating the modification of the present invention;

FIG. 7 is a fragmentary sectional view similar to FIG. 2 illustrating the modification of the present invention used in conjunction with the element illustrated in FIG. 6;

FIG. 8 is a view similar to FIG. 3 illustrating another modification of the present invention; and FIG. 9 is a view similar to FIG. 2 of the drawings illustrating a modification of the invention used in conjunction with the element illustrated in FIG. 8.

DESCRIPTION OF THE PREFERRED EMBODIMENTS

Figures 1, 2, 3, 4:
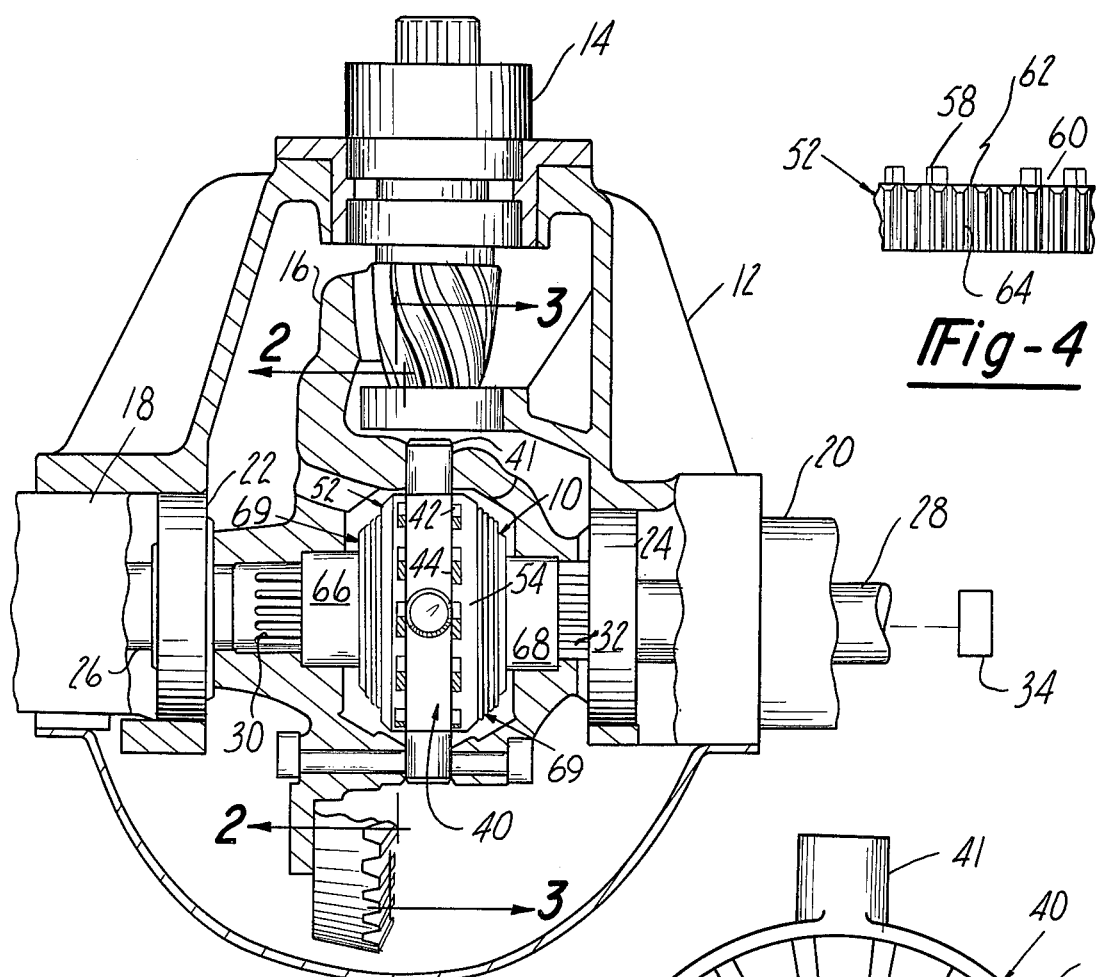
FIG. 1 is a cross-sectional view through a differential carrier incorporating a positive locking differential constructed in accordance with the principles of the present invention.
FIG. 2 is a fragmentary cross-sectional view through the positive locking differential as seen from Line 2—2 of FIG. 1.
FIG. 3 is a fragmentary sectional view through the positive locking differential as seen from Line 3—3 of FIG. 1.
FIG. 4 is a fragmentary view of the positive locking differential as seen from Line 4—4 of FIG. 2.

Referring now to the drawings and, in particular to FIG. 1 wherein there is illustrated one example of the present invention in the form of a positive locking differential 10 mounted within a differential carrier 12. The differential carrier 12 is conventional in structure and includes a yoke 14 which is connected to the vehicle drive shaft through which power from the engine of the vehicle is transmitted via a drive pinion gear 16 to the positive locking differential 10 in the conventional manner. The differential carrier 12 further comprises left- and right-hand axle housings 18 and 20 which respectively mount tapered roller bearing assemblies 22 and 24. In the conventional manner a left axle shaft 26 extends through the axle housing 18 and is rotatably supported by the roller bearing assembly 22, while a right axle 28 extends through the axle housing 20 and is rotatably supported at its inner end by the roller bearing 24. The inner ends of the axles 26 and 28 are splined at 30 and 32, respectively, for engagement with the positive locking differential 10 in a manner which will be described hereinafter. The opposite outer ends of the shafts 26 and 28 terminate in the conventional manner for attachment to the vehicle wheels, which are schematically illustrated at 34. As aforementioned, a prime function of the positive locking differential 10 is to compensate for the differences in driving wheel travel which occurs when turning or when traveling over uneven ground. The other prime function is to prevent wheel spin when one wheel loses traction, a condition which would stall a vehicle not equipped with a positive locking differential. This is because the positive locking differential prevents the driving torque from forcing one wheel to rotate faster than its opposite wheel. When a vehicle is not being driven in a straight, forward direction, the clutch teeth, as will be described hereinafter, of the positive locking differential 10 are fully engaged and give both rear wheels driving torque. If one wheel should loose traction momentarily by rolling onto ice or snow or over a soft shoulder of the road, the opposite wheel, which still has traction, continues to pull the vehicle until traction is regained by both wheels. In normal operation when, for example, the right wheel passes over an obstruction or if the vehicle makes a left turn, the right wheel must travel faster and farther than the left wheel. When this happens, the positive locking differential functions to automatically allow for the difference in wheel travel in a manner which will be described hereinafter.

Referring again to FIG. 1 of the drawings, the input torque from the engine is transmitted through the gear ring and differential case to a spider 40 which, in turn, as can best be seen in FIG. 3, comprises four trunnions 41 projecting radially from a center ring 43 on each side of which is located a plurality of arcuately spaced, radially disposed fixed drive teeth 42 and 44. Still referring to FIG. 3, the positive locking differential 10 further comprises a center cam 46 mounted inside the spider 40 and generally held in position by any suitable means, such as a snap ring (not shown) which permits the center cam 46 to be rotated a limited, predetermined distance within the spider 40, but prevents lateral movement. The center cam 46 is symmetric having nearly the same number of cam lifts 48 (FIGS. 3 and 5) on each side as there are clutch teeth 42 on the spider 40 with the important exception of the arcuately enlarged cam lifts 50 (FIGS. 3 and 5), which are spaced at predetermined arcuate distances; and in the embodiment illustrated in FIG. 3, the enlarged cam lifts 50 are spaced at a distance of 120° from one another. The cam lifts 50 and their manner of operation and function will be described in greater detail hereinafter. The cam lifts 48 and 50 have uniform contours with rounded surfaces that provide anti-friction ramps for disengaging driven clutch members 52 and 54. The driven clutch members 52 and 54 are identical and are located on opposite sides of the spider and center cam assembly. Each of the driven clutch members 52 and 54 have a set of teeth 56 which match the clutch teeth 42 on the spider 40 and through which a driving torque is transmitted when the teeth 42 and 56 are in driving contact. Radially inwardly spaced from the driven clutch teeth 56 and rigidly attacted thereto are clutch cams 58, which are separated by slotted portions 60. The clutch cams 58 are designed to mesh with the cams 48 formed on the center cam 46. The driven clutch member cams 58 have three arcuately spaced, enlarged slotted portions 62 which are adapted to receive one of the enlarged cams 50 formed on the center cam 46 in a manner which will be described hereinafter. The internal diameter of each driven clutch member 52 and 54 has splines 64 which engage the external splines (not shown) of splined side members 66 and 68 (FIG. 1). The two splined side members 66 and 68 are also internally splined to receive the axle shafts' splines 30 and 32 respectively; and, thus, it can be seen that torque is transmitted from the spider 40 to the driven clutch members 52 and 54 and then to the axle shafts 26 and 28 via the splined connections of the splined side members 66 and 68. Suitable retainers and springs 69 are incorporated in the positive locking differential 10 to hold the driven clutch members 52 and 54 against the opposite sides of the spider 40.

It can be seen that the clutch teeth 42 of the spider 40 are engaged with the clutch member teeth 56 of the members 52 and 54 only when the cams 50 are axially aligned with the enlarged slots 62 formed on the clutch members 52 and 54, and the cams 50 are received within the enlarged slots 62.

A more detailed description of the operation of the inventive positive locking differential 10 will be described in greater detail hereinafter.

Referring now to FIGS. 8 and 9 for a description of a modification of the present invention in the form of a spider 70 having the drive teeth 72 which are adapted to lockingly engage driven teeth 74 of a clutch member 76. The spider 70 has a center cam 78 provided with a plurality of uniformly sized and evenly spaced cam lifts 80 which are adapted to engage the clutch cams 82, which in a manner similar to the spider cams 80 are of uniform shape and evenly spaced. As can best be seen in FIG. 9, the clutch member 76 is provided with a plurality of arcuately enlarged teeth 84 at selected arcuate locations, the enlarged teeth 84 being so sized as to be received in enlarged slotted portions 86 similarly spaced on opposite sides of the face of the spider 70. The enlarged teeth 84 are preferably spaced at 120° apart. It can thus be seen that a locking driving engagement between the clutch member 76 and the spider 70 can be obtained only when the enlarged portions 84 of the clutch member 76 are in axial alignment with the enlarged portions 86 of the spider 70.

Referring now to FIGS. 6 and 7 for another modification of the present invention in the form of a spider 90 having a plurality of arcuately spaced drive teeth 92. Additionally, the spider 90 has a plurality of enlarged teeth 94 which are spaced at predetermined locations along each side of the spider 90 and, preferably, at 120° intervals. The spider 90 further comprises a center cam 96 which is provided with a plurality of evenly spaced and uniformly formed cam lifts 98 which function to engage correspondingly shaped and spaced cams 100 formed on the facing side of a clutch member 102. The clutch member 102 further comprises a plurality of driven teeth 104 which are formed at spaced intervals along the facing side thereof, it being of particular importance that enlarged slotted portions 106 are formed at intervals corresponding to the arcuate interval between the enlarged teeth 94 in the spider 90. It can be seen that engagement between the drive teeth 92 of the spider 90 and the driven teeth 104 of the clutch member 102 may occur only when the teeth 94 of the spider are axially aligned with the enlarged slotted portions 106 of the clutch member, the same occurring every 120° of relative movement of the two parts.

In operation when a vehicle is being driven in a straight forward direction, the clutch teeth on both sides of the spider assembly are fully engaged with the clutch teeth on each driven clutch member. Likewise, the fixed cams of the driven clutch members are fully meshed with the cam surfaces of the floating center cam ring mounted on the inside diameter of the spider, as previously described. Engagement of the driving and driven clutch teeth is assured by the pressure of the springs which force the driven clutch members inwardly against the spider and also by the positive locking action developed by the driving faces of the clutch teeth. In this condition, both clutches remain fully engaged so that the assembly operates as a solid unit, and each rear wheel is driven forward at the ring gear speed. When making a turn, differential action is required in order to permit the outside wheel to travel a greater distance and faster than the inside wheel. A conventional bevel gear type differential permits the outside wheel to turn faster than the ring gear speed, while the inside wheel turns slower than the ring gear speed. The positive locking differential 10 allows either wheel to turn faster than the ring gear speed, but does not permit either wheel to turn slower than the ring gear speed when power is applied. When negotiating a right turn, for example, in a forward direction, the right-hand drive clutch member remains fully engaged with the spider clutch teeth and the corresponding cams of the center cam. The driving clutch teeth of the spider transmit the driving force to the driven clutch member which, in turn, drives the right-hand wheel constantly at ring speed, thus propelling the vehicle. The left-hand wheel covers a greater arc than the right-hand wheel and, driven by the traction of the road, must turn faster than the ring gear speed. Likewise, the left-hand driven clutch member must turn faster than the spider. In other words, it permits differences in wheel speeds of differential action. The right-hand row of cams on the center cam member are meshed securely with the cams on the right-hand drive member. With the center cam thus locked in this position so that it cannot rotate with respect to the spider, its cam on the left-hand side serve as ramps upon which the mating cams on the left-hand driven clutch member can rise, enabling the driven clutch member to disengage from the spider. The ramps on the center cam are high enough to permit the clutch teeth on the driven clutch member to clear the teeth on the spider; and due to the enlarged size of the cams 50 on the center cam, the driven clutch member will remain disengaged from the spider teeth until the crest of the ramp of the enlarged portions passes the teeth of the driven clutch and is axially aligned with one of the enlarged slots 60, at which time the driven clutch member is forced back by the spring pressure into full engagement with the clutch teeth of the spider. Depending upon the size of the differential 10 in its particular application and, in particular, in off-road vehicles which employ a planetary gear arrangement at the wheel, engagement and disengagement occur only while there is a relative difference in the speed of the spider and the driven clutch member. As the vehicle completes the turn and is again driven in a straight, forward direction, the differential action is no longer required, and both driven clutch members will become fully engaged as the enlarged teeth 50 are axially aligned with the enlarged slotted portion 60. It should be appreciated that in the embodiment illustrated in FIGS. 6 through 9, the operation is similar, but the driven clutch and the spiders will not come into engagement until the enlarged teeth 94 on the spider 90 (enlarged teeth 84 on the driven clutch member 76) are in axial alignment with the enlarged slotted portion 106 on the clutch member 102 (the slotted portion 86 on the spider 70).

Although a 120° interval between the oversized cams 50 (or teeth 94 and 84) has been indicated as being preferred, in deciding the number of such oversized cams 50 (or teeth 94 and 84), the actual application factors, such as tire size, planetary gear reduction, if any, axle deflection, engine horsepower, drive train ratio, turning radius, load capacity of the vehicle, and terrain, should be considered. Thus, for example, 90° intervals may be more appropriate for certain applications.

It should also be appreciated that the cams 48 and 58 and the teeth 42 and 56 may be of an integral construction, with the groove 110 (FIG. 2) and the groove 112 (FIG. 3) being eliminated. Similar engineering design techniques would be employed in the manufacture of the embodiments illustrated in FIGS. 6 through 9.

It should be understood by those skilled in the art of positive locking differentials that, although several forms of the present invention have been disclosed, other forms may be had, all coming within the spirit of the invention and the scope of the appended claims.

What is claimed is as follows:

1. A positive locking differential for compensating for the difference in driving wheel travel comprising:
    a spider member having a plurality of arcuately spaced drive teeth on opposite sides thereof;
    a pair of clutch members sandwiching said spider member thereinbetween, said clutch members each having a plurality of driven teeth releasably engageable with said spider member drive teeth for transmitting torque from said spider member to said clutch members;
    a plurality of arcuately spaced first cams carried by said spider member;
    a plurality of arcuately spaced second cams carried by each of said clutch members and axially aligned with said spider member cams for lifting said clutch member teeth out of engagement with said spider member teeth to permit relative movement between said spider member and one of said clutch members; and
    a plurality of enlarged projections and mating enlarged slots carried between said spider member and clutch members for maintaining said relative movement between said spider member and one clutch member for an arcuate distance greater than the arcuate distance between adjacent spider member cams, said enlarged projections being a one-piece construction with one of said members.

2. The positive locking differential defined in claim 1 wherein said enlarged projections are arcuately spaced from said spider member cams, and said enlarged slots are arcuately spaced from said clutch member cams.

3. The positive locking differential defined in claim 2 wherein said enlarged projections are spaced at 120° intervals.

4. The positive locking differential defined in claim 1 wherein said enlarged projections are arcuately spaced from said spider member teeth, and said enlarged slots are arcuately spaced from said clutch member teeth.

5. The positive locking differential defined in claim 4 wherein said projections are spaced at 120° intervals.

6. The positive locking differential defined in claim 1 wherein said enlarged projections are arcuately spaced from said clutch member teeth, and said enlarged slots are arcuately spaced from said spider member teeth.

7. The positive locking differential defined in claim 6 wherein said projections are spaced at 120° intervals.

8. The positive locking differential defined in claim 3 wherein said slots are spaced at 120° intervals.